(12) United States Patent
Lindner et al.

(10) Patent No.: US 9,023,909 B2
(45) Date of Patent: May 5, 2015

(54) PROCESS FOR PRODUCING A POLYURETHANE FOAM AND POLYURETHANE FOAM OBTAINABLE THEREFROM

(75) Inventors: Stefan Lindner, Köln (DE); Wolfgang Friederichs, Köln (DE); Reinhard Strey, Dormagen (DE); Thomas Sottmann, Köln (DE); Elena Khazova, Mannheim (DE); Lorenz Kramer, Köln (DE); Verena Dahl, Köln (DE); Agnes Chalbi, Hürth (DE)

(73) Assignee: Bayer MaterialScience AG, Leverkusen (DE)

( * ) Notice: Subject to any disclaimer, the term of this patent is extended or adjusted under 35 U.S.C. 154(b) by 428 days.

(21) Appl. No.: 13/505,785

(22) PCT Filed: Nov. 3, 2010

(86) PCT No.: PCT/EP2010/066738
§ 371 (c)(1),
(2), (4) Date: Jun. 6, 2012

(87) PCT Pub. No.: WO2011/054868
PCT Pub. Date: May 12, 2011

(65) Prior Publication Data
US 2012/0238655 A1    Sep. 20, 2012

(30) Foreign Application Priority Data
Nov. 6, 2009 (DE) .......................... 10 2009 053 224

(51) Int. Cl.
*C08G 18/76* (2006.01)
*C08J 9/12* (2006.01)
(Continued)

(52) U.S. Cl.
CPC ............ *C08G 18/42* (2013.01); *C08G 18/6644* (2013.01); *C08G 2101/00* (2013.01); *C08J 9/12* (2013.01); *C08J 2203/08* (2013.01); *C08J 2375/04* (2013.01); *C08J 2375/06* (2013.01)

(58) Field of Classification Search
CPC ............ C08G 18/664; C08G 18/6644; C08G 2101/00; C08G 2101/0025; C08G 2101/0091

USPC ......................................................... 521/170
See application file for complete search history.

(56) References Cited

U.S. PATENT DOCUMENTS 4,576,974 A * 3/1986 Carroll et al. .................. 521/173
5,223,549 A * 6/1993 Wiedermann et al. ........ 521/107
(Continued)

FOREIGN PATENT DOCUMENTS

DE       10260815 A1    7/2004
EP        0353061 A2    1/1990
(Continued)

OTHER PUBLICATIONS

International Search Report for PCT/EP2010/066738 mailed Feb. 9, 2011.
(Continued)

*Primary Examiner* — Mike M Dollinger
(74) *Attorney, Agent, or Firm* — Drinker Biddle & Reath LLP

(57) ABSTRACT

Process for producing a polyurethane foam and polyurethane foam obtainable therefrom A process for producing a polyurethane foam with bimodal cell size distribution, comprising the following steps:
 providing a mixture in a mixing head, where the mixture comprises:
  A) a component reactive towards isocyanates;
  B) a surfactant component;
  C) a blowing agent component selected from the group consisting of linear, branched or cyclic $C_1$- to $C_6$-alkanes, linear, branched or cyclic $C_1$- to $C_6$-fluoroalkanes, $N_2$, $O_2$, argon and/or $CO_2$,
   where blowing agent component C) is present in the supercritical or near-critical state;
  D) a polyisocyanate component;
 discharging the mixture comprising components A), B), C), and D) from the mixing head where, during the discharge of the mixture, the pressure prevailing in the mixture is lowered to atmospheric pressure.

8 Claims, 4 Drawing Sheets

(51) Int. Cl.
  *C08G 18/42*    (2006.01)
  *C08G 18/66*    (2006.01)
  *C08G 101/00*   (2006.01)

(56)      References Cited

U.S. PATENT DOCUMENTS

| | | | |
|---|---|---|---|
| 6,472,446 B1* | 10/2002 | Riley et al. | 521/131 |
| 8,124,665 B2* | 2/2012 | Rosthauser et al. | 521/176 |
| 8,551,201 B2* | 10/2013 | Zhang et al. | 51/296 |
| 2003/0065045 A1* | 4/2003 | Falke et al. | 521/155 |
| 2003/0144368 A1 | 7/2003 | Sulzbach et al. | |
| 2004/0054022 A1 | 3/2004 | Ohnuma et al. | |
| 2005/0131090 A1 | 6/2005 | Furlan et al. | |
| 2006/0100295 A1* | 5/2006 | Heraldo et al. | 521/99 |
| 2006/0127663 A1 | 6/2006 | Strey et al. | |
| 2009/0062414 A1* | 3/2009 | Huang et al. | 521/159 |
| 2009/0137120 A1* | 5/2009 | Huang et al. | 438/692 |
| 2009/0312447 A1* | 12/2009 | Hickey | 521/131 |

FOREIGN PATENT DOCUMENTS

| | | |
|---|---|---|
| GB | 2365013 A | 2/2002 |
| JP | 200247326 A | 2/2002 |
| WO | WO-01/98389 A1 | 12/2001 |
| WO | WO-0234823 A2 | 5/2002 |
| WO | WO-2007094780 A1 | 8/2007 |

OTHER PUBLICATIONS

Kahlweit, M., et al., Phase Behavior of Ternary Systems of the Type $H_2O$-Oil-Nonionic Amphiphile (Microemulsions) (1985), Angew. Chem. Int. Ed. Engl. 24, pp. 654-668.

* cited by examiner

PROCESS FOR PRODUCING A POLYURETHANE FOAM AND POLYURETHANE FOAM OBTAINABLE THEREFROM

CROSS-REFERENCE TO RELATED APPLICATIONS

This application is a national stage application (under 35 U.S.C. §371) of PCT/EP2010/066738, filed Nov. 3, 2010, which claims benefit of German application 10 2009 053 224.2, filed Nov. 6, 2009, both of which are incorporated herein by reference in their entirety for all their useful purposes.

BACKGROUND

The present invention relates to a process for producing a polyurethane foam. The invention further relates to a polyurethane foam obtainable by the process of the invention. These foams may in particular have a bimodal cell size distribution.

Theoretical considerations make nanocellular or nanoporous polymer foams particularly good materials for thermal insulation. The interior dimensions of these foam structures are in the region of the mean free path lengths of a gas molecule. The contribution of the gas to heat transmission can thus be reduced. Polyurethanes are a polymer group often used in thermal insulation.

When polyurethane foams are produced, a polyol component, which also comprises a blowing agent, is reacted with an isocyanate. The reaction of isocyanate with water produces carbon dioxide, which also acts as blowing agent.

The decisive step for the formation of the foam and therefore for the subsequent cell size of the hardened foam, is the nucleation provided by blowing agents, since each cell in the foam has been produced from a gas bubble. A relevant observation here is that after nucleation no new gas bubbles are generally produced, but instead blowing agent diffuses into existing gas bubbles.

Addition of stabilizers promotes the emulsification of the various components, influences nucleation, and inhibits coalescence of the expanding gas bubbles. They also influence cell opening. In open-cell foams, the membranes of the expanding pores are opened and the pore walls are retained.

One possible approach emulsifies a supercritical blowing agent in the reaction mixture and then hardens the foam after a pressure reduction. A known variant here is the POSME process (principle of supercritical micro emulsion expansion). The blowing agent in the said process takes the form of a microemulsion. Microemulsions form under particular conditions, which depend inter alia on the concentration of the emulsifiers and on the temperature. A feature of microemulsions is that they are stable and that the non-polar phase, the blowing agent in this case, can be present in the form of very small droplets within the polar phase. The diameters of these droplets can be in the range from 1 to 100 nanometres.

DE 102 60 815 A1 discloses foamed material and a production process for the foamed material. The intention is that foamed material with nano-size foam bubbles be produced without any need to surmount the energy barrier which usually arises at phase transitions and in nucleation processes. An objective associated with this is controllable production of a foamed material which has a numeric density of foam bubbles of from $10^{12}$ to $10^{18}$ per $cm^3$, and also an average diameter of foam bubbles of from 10 nm to 10 μm. It is based on the dispersion of a second fluid in the form of pools within a matrix of a first fluid. The first fluid is present in the form of matrix in a reaction space, and the second fluid is present in the form of pools. The second fluid is converted into a near-critical or supercritical state with a density close to that of a liquid, through a change in pressure and/or temperature. The second fluid is therefore entirely or almost entirely in the form of pools which have uniform distribution within the entire first fluid. Depressurization causes the second fluid to revert to a state with gaseous density, and the pools here are expanded to give nanometre-size foam bubbles. There is no need to surmount any energy barrier, and there is no requirement that the blowing agent molecules diffuse to the expanding bubbles.

A polymerizable substance is generally proposed as first fluid here. However, express mention is made only of acrylamide, which polymerizes to give polyacrylamide, and melamine, which polymerizes to give melamine resin. The second fluid should be one selected from a group of hydrocarbon substances, such as methane or ethane, or else from alkanols, fluorochlorocarbons or $CO_2$. An amphiphilic material is also used, and this should have at least one block with affinity for the first fluid, and at least one block with affinity for the second fluid.

WO 2007/094780 A1 discloses, in relation to polyurethane foams, a resin composition with a polyol, an ethoxylated/propoxylated surfactant initiated by a short-chain compound, and also a hydrocarbon as blowing agent. The ethoxylated/propoxylated surfactant increases the solubility and/or compatibility of the hydrocarbon blowing agent and improves the phase stability of the resin composition. The resin composition is suitable for the reaction with polyfunctional organic isocyanates to produce cellular polyurethane foams and cellular polyisocyanurate foams.

The surfactants are obtained through the reaction of ethylene oxide and propylene oxide with an initiator from the group of compounds having an alkylene-oxide-active hydrogen atom and a $C_1$ to $C_6$ aliphatic or alicyclic hydrocarbon group, compounds having an alkylene-oxide-active hydrogen atom and a $C_6$ to $C_{10}$ aryl or alkylaryl hydrocarbon group, or combinations thereof. The initiator is preferably selected from the group of the $C_1$ to $C_6$ aliphatic or alicyclic alcohols, phenol, $C_1$ to $C_4$ alkylphenols and combinations thereof.

Butanol-initiated propylene oxide/ethylene oxide surfactant is mentioned as an example. As an alternative, the surfactant can also comprise an alkoxylated triglyceride adduct or an ethoxylated derivative of a sorbitan ester. The blowing agent can be a $C_4$ to $C_7$ aliphatic hydrocarbon, $C_4$ to $C_7$ cycloaliphatic hydrocarbon or a combination thereof. Pentanes are mentioned as an example.

However, the examples mentioned do not disclose any polyol composition in which the selection of the surfactants leads to the presence of the blowing agent in the form of a microemulsion.

Specific siloxane surfactants are addressed inter alia in US 2005/0131090 A1. Here, a process is disclosed for producing rigid polyurethane foams through reaction of a polyisocyanate and of a polyol in the presence of a urethanization catalyst, of a blowing agent, and optionally of water and of a silicone surfactant. Blowing agents used are $C_4$- or $C_5$-hydrocarbons, or a mixture of these. The average molar mass of the blowing agents is ≤72 g/mol and their boiling point is in the range from 27.8 to 50° C. The silicone surfactant comprises a polyether-polysiloxane copolymer which is represented by the following general formula: $(CH_3)_3$—Si—O—$(Si(CH_3)_2$—O$)_x$—$(Si(CH_3)(R)O)_y$—$Si(CH_3)_3$, in which:
R=$(CH_2)_3$—O—(—$CH_2$—$CH_2$—O$)_a$—$(CH_2$—CH$(CH_3)$—O$)_b$—R" and in which R" is H, $(CH_2)_z CH_3$ or C(O)

CH$_3$. Furthermore: x+y+2 is 60-130, x/y is 5-14 and z is 0-4. The total molar mass of the surfactant, based on the above formula, is from 7000 to 30 000 g/mol. The proportion by weight of the siloxane in the surfactant is from 32 to 70% by weight, the average molar mass (BAMW, blend average molecular weight) of the polyether fraction is from 450 to 1000 g/mol, and the content of ethylene oxide, expressed in mol %, in the polyether fraction is from 70 to 100 mol %. However, the said publication does not relate to any microemulsions or blowing agents in the supercritical state. Instead, the siloxane surfactant is used as cell stabilizer.

GB 2 365 013 A discloses alkylene-oxide-modified silicone glycols for stable polyester polyol compositions. A polyester polyol composition comprises a phthalic anhydride-initiated polyester polyol, a C$_4$-C$_6$-hydrocarbon blowing agent and an alkylene-modified silicone glycol compatibilizer with an HLB value of from about 5 to about 8. The blowing agent is soluble in the polyol composition, and the risk associated with blowing agents of this type in the production of rigid polymer foam products is thus reduced. Rigid foams are provided with good dimensional stability and with improved insulation properties. An isocyanate-modified silicone glycol compatibilizer is also disclosed.

The said Patent Application states that in some instances a particular blowing agent forms a microemulsion with the polyol and with other components. However, there is no disclosure as to whether supercritical conditions prevail here for the blowing agent. Instead, the information about microemulsions relates to the test for determining the storage stability of the polyol compositions. In the said test, the polyol composition and the blowing agent are mixed in a glass jar with cap and are shaken, and are stored at room temperature for five days. If no phase separation occurs, the blowing agent is found to be soluble in the polyol composition and the composition is found to be stable in storage. However, storage in a glass jar with cap at room temperature is not likely to provide any conditions under which a C$_4$-C$_6$-hydrocarbon is present in the supercritical state.

The said Patent Application moreover mentions that, during the production of the foams, the starting materials can be introduced at a temperature of from 15° C. to 90° C., preferably from 20° C. to 35° C., into an open or closed mould. The prevailing pressure can be above atmospheric pressure. The mixing of the isocyanate with the polyol composition which comprises dissolved blowing agent can be achieved through stirring or at high pressure through injection. The temperature of the mould can be from 20° C. to 110° C., preferably from 30° C. to 60° C. and in particular from 45° C. to 50° C. Here again, there are no indications that supercritical conditions for the blowing agent prevail.

WO 2001/98389 A1 describes the rapid depressurization of CO$_2$-containing reaction mixtures. That Patent Application relates to a process for producing polyurethane block foam where a reactive polyurethane mixture comprising carbon dioxide is depressurized suddenly from a pressure above the equilibrium solution pressure of the carbon dioxide to atmospheric pressure. The reactive liquid polyurethane mixture is foamed with release of dissolved carbon dioxide, and the foamed mixture is applied to a substrate and then hardened to give the block foam. The carbon dioxide is initially completely dissolved in the reactive mixture or in at least one of the components, polyol and isocyanate, at a pressure substantially above the equilibrium solution pressure. The pressure is then reduced to a pressure close to the equilibrium solution pressure, whereupon at some junctures here the pressure is less than the equilibrium solution pressure, with release of small amounts of the carbon dioxide with formation of a microdispersion of bubbles, the components are mixed if appropriate, and the pressure is suddenly reduced to atmospheric pressure, before the carbon dioxide released is completely redissolved. However, that document gives no indications of nanocellular foams or supercritical conditions for the blowing agent.

A foam with a multimodal cell size distribution (multimodal foam) provides performance advantages, for example greater toughness and improved insulation capability, in comparison with a conventional foam of identical polymer constitution which however has a generally uniform cell size distribution. A foam with a bimodal cell size distribution (bimodal foam) is a type of multimodal foam.

Processes described in the past for producing multimodal foams expand a foamable polymer composition which comprises water. Water has a tendency to produce corrosive acid when it reacts with halogenated flame retardants. The corrosive acid is undesirable because it can corrode the process apparatus. WO 2002/034823 A1 describes a process which can produce a multimodal foam and which requires no water and preferably an environmentally compatible blowing agent.

That Patent Application relates to a process for producing a multimodal thermoplastic polymer foam comprising the following sequential steps: (a) dispersing a blowing agent stabilizer and a blowing agent into a heat-plasticized thermoplastic polymer resin at an initial pressure to form a foamable composition, and (b) expanding the said foamable polymer composition in the substantial absence of water and at a pressure less than the said initial pressure to produce a multimodal thermoplastic foam.

A disadvantage here, however, is that only heat-plastifiable thermoplastics can be processed. The said process excludes, for example, thermoset polyurethane polymers. It would be desirable, however, to have processes which can produce polyurethane foams with in particular bimodal cell size distribution with use of supercritical blowing agents to achieve small cell sizes.

BRIEF DESCRIPTION OF EMBODIMENTS

According to the invention, a process is therefore proposed for producing a polyurethane foam, comprising the following steps:
providing a mixture in a mixing head, where the mixture comprises:
A) a component reactive towards isocyanates;
B) a surfactant component;
C) a blowing agent component selected from the group consisting of linear, branched or cyclic C$_1$- to C$_6$-alkanes, linear, branched or cyclic C$_1$- to C$_6$-fluoroalkanes, N$_2$, O$_2$, argon and/or CO$_2$,
where blowing agent component C) is present in the supercritical or near-critical state;
D) a polyisocyanate component;
discharging the mixture comprising components A), B), C), and D) from the mixing head where, during the discharge of the mixture, the pressure prevailing in the mixture is lowered to atmospheric pressure.

The process of the invention can give polyurethane foams with very small pore sizes, and also foams with bimodal cell size distribution. By way of example, one maximum of the cell size distribution can be in the range from ≥10 nm to ≤500 nm and a further maximum of the cell size distribution can be in the range from ≥1 µm to ≤500 µm.

BRIEF DESCRIPTION OF THE DRAWINGS

The foregoing brief description, as well as the following detailed description, may be better understood when read in In the drawings.

DETAILED DESCRIPTION OF EMBODIMENTS

Figure 1:
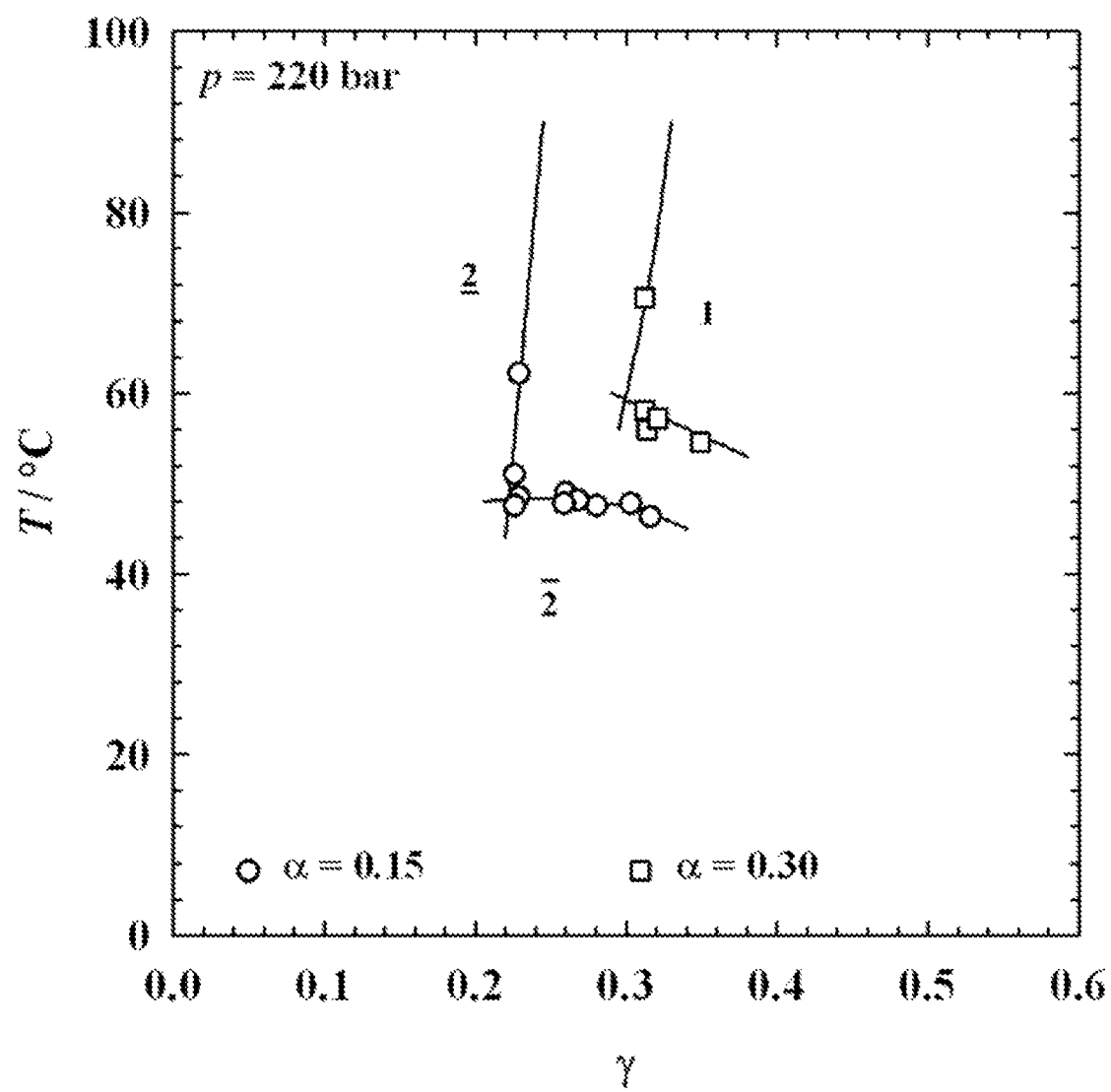
FIG. 1 illustrates a graph of the temperature T plotted against the surfactant content γ for the system characterized in Example 1.

The process uses supercritical or near-critical blowing agent. For the purposes of the present invention, near-critical conditions are present when there is compliance with the following condition: $(T_c-T)/T \leq 0.4$ and/or $(p_c-p)/p \leq 0.4$. T here means the temperature prevailing in the process, $T_c$ here means the critical temperature of the blowing agent or blowing agent mixture, p here means the pressure prevailing in the process and $p_c$ here means the critical pressure for the blowing agent or blowing agent mixture. It is preferable that near-critical conditions present comply with the following: $(T_c-T)/T \leq 0.3$ and/or $(p_c-p)/p \leq 0.3$ and it is particularly preferable that near-critical conditions present comply with the following: $(T_c-T)/T \leq 0.2$ and/or $(p_c-p)/p \leq 0.2$. Without attachment to any theory, it is assumed that the selection of suitable surfactant components leads to formation of emulsions or microemulsions of the supercritical or near-critical blowing agent in the phase with components reactive towards isocyanates.

The mixture comprising components A), B), C) and D) can by way of example be obtained by using, as initial charge, in a high-pressure mixing head, under conditions which are supercritical or near-critical for the blowing agent, all of the components with the exception of the polyisocyanate component, and then admixing the polyisocyanate D) therewith.

During discharge of the mixture from the mixing head, the pressure prevailing in the mixture is lowered to atmospheric pressure. Atmospheric pressure here in particular means a pressure from ≥0.9 bar to ≤1.1 bar. The blowing agent is converted to the subcritical state, and preferably to the gaseous state. By way of example, the reaction mixture can be introduced from the mixing head simply into an open mould, or can be utilized continuously for producing sheets, for example through free-foaming systems or twin-conveyor systems.

A foam with a bimodal cell size distribution for the purposes of the present invention is present when a graph of the representative cross-sectional area plotted against the cell size has two maxima. A "representative cross-sectional area" is a product of a number of cells of a given size and the cross-sectional area of the cell. A representative cross-sectional area corresponds to the area occupied by cells of a given size in the scanning electron micrograph. Cell size is based on cell diameter, and the two expressions are interchangeable herein.

A scanning electron micrograph (SEM) of a cross section of a foam is used in order to collect data on the cell diameter and on the representative cross-sectional area for the foam. The magnification of the SEM should be adequate to provide a representative distribution of the cell sizes in the foam. The diameter is measured for each cell in the SEM. Defects, for example "blowing cavities", are not considered to be cells. Blowing cavities are spaces defined within a foam which penetrate a plurality of cell walls and intercellular structures, and within which there are a large number of residual cell-wall fragments and residual intercellular-structure fragments. A cell wall is a polymer film between two cells. An intercellular structure is a polymer domain where three or more cells meet.

The cross-sectional area is calculated for each cell by assuming a circular cross section. An approximate diameter is therefore estimated for non-circular cell cross sections, and will generate an approximate cross-sectional area. (By way of example, for oval-shaped cells an average diameter between the largest and smallest diameter is used.) The cell diameter is used to calculate a cross-sectional area for each cell by assuming that each cell has a circular cross section. (Cross-sectional area=$\frac{1}{2} \cdot \pi \cdot (\text{diameter}/2)^2$.)

A convenient programme for measuring cell diameters and calculating cross-sectional areas from a digitally scanned image is the Public Domain NIH Image Software from United States National Institutes of Health (NIH) (obtainable from the Internet at http://rsb.info.nih.gov/nih-image/). The representative cross-sectional area is calculated by taking the cross-sectional area for each cell of a given size and multiplying this by the number of cells of the said size in an SEM. The cell sizes are measured in nm or μm and rounded to two significant figures.

In order to determine the cell size distribution, a graph is prepared with the cell size on the x-axis and with the representative area on the y-axis. Cells which exhibit a peak ("small peak") corresponding to the smallest cell size(s) are "small cells". Cells which exhibit a peak ("large peak") corresponding to the largest cell size(s) are "large cells". "Medium-range cells" exhibit "medium-range peaks" between a small peak and a large peak. Similarly, when a small peak and a large peak overlap to some extent, cells exhibiting the overlapping range are medium-range cells. Medium-range cells can have properties similar to those of large cells, or of small cells, or can have properties of any combination of large and small cells.

A "peak" is a point on a graph which has at least one point, proceeding along the x-axis of the graph, with a lower y-axis value both before it and after it, before there is a point with a higher x-axis value. A peak can comprise more than one point with identical y-axis values (a plateau), with the proviso that the point on both sides of the plateau (proceeding along the x-axis of the graph) exhibits a lower y-axis value than the points which make up the plateau.

Pressures suitable for carrying out the process of the invention can by way of example be in the range from ≥40 bar to ≤300 bar. Examples of suitable temperatures are from ≥10° C. to ≤80° C. and preferably from ≥25° C. to ≤60° C. Particular preference is given to pressures and temperatures above the critical point of $CO_2$, i.e. ≥73.7 bar and ≥31° C.

Suitable components A) reactive towards isocyanates are in particular polyols, polyamines, polyaminoalcohols and polythiols.

Examples of polyamines are ethylenediamine, 1,2- and 1,3-diaminopropane, 1,4-diaminobutane, 1,6-diaminohexane, isophoronediamine, an isomer mixture of 2,2,4- and 2,4,4-trimethylhexamethylenediamine, 2-methylpentamethylenediamine, diethylenetriamine, 1,3- and 1,4-xylylenediamine, α,α,α',α'-tetramethyl-1,3- and -1,4-xylylenediamine and 4,4'-diaminodicyclohexylmethane, diethylmethylbenzenediamine (DETDA), 4,4'-diamino-3,3'-dichlorodiphenylmethane (MOCA), dimethylethylenediamine, 1,4-bis(aminomethyl)cyclohexane, 4,4'-diamino-3,3'-dimethyldicyclohexylmethane and 4,4'-diamino-3,5-diethyl-3',5'-diisopropyldicyclohexylmethane. Polymeric polyamines, such as polyoxyalkyleneamines, are moreover suitable.

Examples of aminoalcohols are N-aminoethylethanolamine, ethanolamine, 3-aminopropanol, neopentanolamine and diethanolamine.

Examples of polythiols are di(2-mercaptoethyl) ether, pentaerythritol tetrakisthioglycolate, pentaerythritol tetrakis(3-mercaptopropionate) and 1,2-bis((2-mercaptoethyl)thio)-3-mercaptopropane.

The number-average molar mass $M_n$ of the polyols that can be used according to the invention can by way of example be from $\geq 62$ g/mol to $\leq 8000$ g/mol, preferably from $\geq 90$ g/mol to $\leq 5000$ g/mol and more preferably from $\geq 92$ g/mol to $\leq 1000$ g/mol. If a single polyol is added, the OH number of component A) is the OH number of the said polyol. In the case of mixtures, the average OH number is stated. This value can be determined by reference to DIN 53240. The average OH functionality of the polyols mentioned is by way of example $\geq 2$, for example in the range from $\geq 2$ to $\leq 6$, preferably from $\geq 2.1$ to $\leq 4$ and more preferably from $\geq 2.2$ to $\leq 3$.

Examples of polyether polyols that can be used according to the invention are the polytetramethylene glycol polyethers that are obtainable through polymerization of tetrahydrofuran by means of cationic ring opening.

Polyether polyols likewise suitable are adducts of styrene oxide, ethylene oxide, propylene oxide, butylene oxides and/or epichlorohydrin onto di- or polyfunctional starter molecules.

Examples of suitable starter molecules are water, ethylene glycol, diethylene glycol, butyldiglycol, glycerol, diethylene glycol, trimethylolpropane, propylene glycol, pentaerythritol, sorbitol, sucrose, ethylenediamine, toluenediamine, triethanolamine, 1,4-butanediol, 1,6-hexanediol, and also low-molecular-weight hydroxylated esters of polyols of this type with dicarboxylic acids.

Polyester polyols that can be used according to the invention are inter alia polycondensates of di- and also tri- and tetraols and di- and also tri- and tetracarboxylic acids, or of hydroxycarboxylic acids or of lactones. Instead of the free polycarboxylic acids it is also possible to use the corresponding polycarboxylic anhydrides, or corresponding polycarboxylic esters of lower alcohols, to produce the polyesters.

Examples of suitable diols are ethylene glycol, butylene glycol, diethylene glycol, triethylene glycol, polyalkylene glycols, such as polyethylene glycol, and also 1,2-propanediol, 1,3-propanediol, 1,3-butanediol, 1,4-butanediol, 1,6-hexanediol, and isomers, neopentyl glycol or neopentyl glycol hydroxypivalate. Other polyols that can be used, alongside these, are those such as trimethylolpropane, glycerol, erythritol, pentaerythritol, trimethylolbenzene or trishydroxyethyl isocyanurate.

Examples of polycarboxylic acids that can be used are phthalic acid, isophthalic acid, terephthalic acid, tetrahydrophthalic acid, hexahydrophthalic acid, cyclohexanedicarboxylic acid, adipic acid, azelaic acid, sebacic acid, glutaric acid, tetrachlorophthalic acid, maleic acid, fumaric acid, itaconic acid, malonic acid, suberic acid, succinic acid, 2-methylsuccinic acid, 3,3-diethylglutaric acid, 2,2-dimethylsuccinic acid, dodecanedioic acid, endomethylenetetrahydrophthalic acid, dimer fatty acid, trimer fatty acid, citric acid, or trimellitic acid. It is also possible to use the corresponding anhydrides as acid source.

To the extent that the average functionality of the polyol to be esterified is $\geq 2$, it is also possible to make additional concomitant use of monocarboxylic acids, such as benzoic acid and hexanecarboxylic acid.

Examples of hydroxycarboxylic acids which can be used concomitantly as reactants during the production of a polyester polyol having terminal hydroxyl groups are hydroxycaproic acid, hydroxybutyric acid, hydroxydecanoic acid, hydroxystearic acid and the like. Suitable lactones are inter alia caprolactone, butyrolactone and homologues.

Polycarbonate polyols that can be used according to the invention are hydroxylated polycarbonates, for example polycarbonatediols. These are obtainable through reaction of carbonic acid derivatives, such as diphenyl carbonate, dimethyl carbonate or phosgene, with polyols, preferably diols, or through the copolymerization of alkylene oxides, e.g. propylene oxide, with $CO_2$.

Examples of diols of this type are ethylene glycol, 1,2- and 1,3-propanediol, 1,3- and 1,4-butanediol, 1,6-hexanediol, 1,8-octanediol, neopentyl glycol, 1,4-bishydroxymethylcyclohexane, 2-methyl-1,3-propanediol, 2,2,4-trimethyl-1,3-pentanediol, dipropylene glycol, polypropylene glycols, dibutylene glycol, polybutylene glycols, bisphenol A and lactone-modified diols of the abovementioned type.

Instead of or in addition to pure polycarbonatediols, it is also possible to use polyether polycarbonatediols.

Polyetherester polyols that can be used according to the invention are compounds which comprise ether groups, ester groups and OH groups. Suitable compounds for producing the polyetherester polyols are organic dicarboxylic acids having up to 12 carbon atoms, preferably aliphatic dicarboxylic acids having from $\geq 4$ to $\leq 6$ carbon atoms, or aromatic dicarboxylic acids, where these are used individually or in a mixture. Examples that may be mentioned are suberic acid, azelaic acid, decanedicarboxylic acid, maleic acid, malonic acid, phthalic acid, pimelic acid and sebacic acid, and also in particular glutaric acid, fumaric acid, succinic acid, adipic acid, phthalic acid, terephthalic acid and isoterephthalic acid. Examples of derivatives of the said acids that can be used are their anhydrides, and also their esters and hemiesters with low-molecular-weight, monohydric alcohols having from $\geq 1$ to $\leq 4$ carbon atoms.

Another component used for producing the polyetherester polyols are polyether polyols, where these are obtained through alkoxylation of starter molecules, such as polyhydric alcohols. The starter molecules are at least difunctional, but can also optionally comprise content of starter molecules which have higher functionality, in particular being trifunctional.

Examples of starter molecules are diols having primary OH groups and number-average molar masses $M_n$ which are preferably from $\geq 18$ g/mol to $\leq 400$ g/mol or from $\geq 62$ g/mol to $\leq 200$ g/mol, for example 1,2-ethanediol, 1,3-propanediol, 1,2-propanediol, 1,4-butanediol, 1,5-pentenediol, 1,5-pentanediol, neopentyl glycol, 1,6-hexanediol, 1,7-heptanediol, 1,8-octanediol, 1,10-decanediol, 2-methyl-1,3-propanediol, 2,2-dimethyl-1,3-propanediol, 3-methyl-1,5-pentanediol, 2-butyl-2-ethyl-1,3-propanediol, 2-butene-1,4-diol and 2-butyne-1,4-diol, etherdiols, such as diethylene glycol, triethylene glycol, tetraethylene glycol, dibutylene glycol, tributylene glycol, tetrabutylene glycol, dihexylene glycol, trihexylene glycol, tetrahexylene glycol, and oligomer mixtures of alkylene glycols, such as diethylene glycol.

Polyols having number-average functionalities of from >2 to $\leq 8$, or from $\geq 3$ to $\leq 4$, can also be used concomitantly alongside the diols, examples being 1,1,1-trimethylolpropane, triethanolamine, glycerol, sorbitan and pentaerythritol, and also polyethylene oxide polyols with average molar masses which are preferably from ≥62 g/mol to ≤400 g/mol or from ≥92 g/mol to ≤200 g/mol, where these use triols or tetraols as starters.

Polyetherester polyols can also be produced through the alkoxylation of reaction products obtained through the reaction of organic dicarboxylic acids with diols. Examples of derivatives of the said acids that can be used are their anhydrides, an example being phthalic anhydride.

Polyacrylate polyols can be obtained through free-radical polymerization of hydroxylated olefinically unsaturated monomers or through free-radical copolymerization of hydroxylated olefinically unsaturated monomers with, optionally, other olefinically unsaturated monomers. Examples here are ethyl acrylate, butyl acrylate, 2-ethylhexyl acrylate, isobornyl acrylate, methyl methacrylate, ethyl methacrylate, butyl methacrylate, cyclohexyl methacrylate, isobornyl methacrylate, styrene, acrylic acid, acrylonitrile and/or methacrylonitrile. Particularly suitable hydroxylated olefinically unsaturated monomers are 2-hydroxyethyl acrylate, 2-hydroxyethyl methacrylate, the hydroxypropyl acrylate isomer mixture obtainable through an addition reaction of propylene oxide with acrylic acid, and also the hydroxypropyl methacrylate isomer mixture obtainable through an addition reaction of propylene oxide with methacrylic acid. Terminal hydroxy groups can also be present in protected form. Suitable free-radical initiators are those from the group of the azo compounds, e.g. azoisobutyronitrile (AIBN), or from the group of the peroxides, e.g. di-tert-butyl peroxide.

Surfactants suitable for the process of the invention are not subject to any immediate restrictions with respect to their selection. The surfactants advantageously permit the blowing agent to form emulsions or microemulsions in the phase reactive towards isocyanates. Examples of surfactants are alkoxylated alkanols, for example ethers of linear or branched alkanols having from ≥6 to ≤30 carbon atoms with polyalkylene glycols having from ≥5 to ≤100 alkylene oxide units, alkoxylated alkylphenols, alkoxylated fatty acids, fatty acid esters, polyalkyleneamines, alkyl sulphates, phosphatidylinositols, fluorinated surfactants, surfactants comprising polysiloxane groups and/or bis(2-ethyl-1-hexyl)sulphosuccinate. Fluorinated surfactants can be perfluorinated or partially fluorinated surfactants. Examples here are partially fluorinated ethoxylated alkanols or carboxylic acids.

Surfactant component B) preferably comprises a siloxane-terminated polyalkylene oxide polyether. The structure of these surfactants can be linear or branched. This type of surfactant to be used according to the invention can by way of example be obtained through the hydrosilylation of an unsaturated compound with a polysiloxane bearing Si—H groups. The unsaturated compound can inter alia be the reaction product of allyl alcohol with ethylene oxide or propylene oxide.

The surfactant can also by way of example be obtained through the reaction of polyether alcohols with a polysiloxane bearing Si—Cl groups. All of the end groups in the polyether can be siloxane-terminated groups. It is also possible that mixed end groups are present, i.e. that siloxane end groups and OH end groups or reaction-functionalized OH end groups, such as methoxy groups, are present. The siloxane termination can be a monosiloxane group $R_3Si$—O— or an oligo- or polysiloxane group $R_3Si$—O—$[R_2Si$—O$]_n$-[AO], where by way of example n is from ≥1 to ≤100. In the case of branched surfactants, the siloxane termination can also have a structure $R_3Si$—O—$RSi[AO]$-O—$[R_2Si$—O$]_m$—O—$SiR_3$, where by way of example m is from ≥0 to ≤10, or can have a comb polymer structure $R_3Si$—O—$[RSi[AO]]_n$-O—$[R_2Si$—O$]_m$—O—$SiR_3$, where m+n is from ≥0 to ≤250. In the instances mentioned it is preferable that the moiety R is an alkyl group, in particular a methyl group. The group [AO] is a polyalkylene oxide moiety, preferably polyethylene oxide and/or polypropylene oxide. The group [AO] can also have linkage to the siloxane by way of a connecting group, such as $C_3H_6$.

The blowing agents C) that can be used according to the invention are present in the supercritical or near-critical state, i.e. above the critical temperature and above the critical pressure. The blowing agent can form a separate phase in the reaction mixture. By way of example, supercritical carbon dioxide can be used. It is possible that the carbon dioxide is formed during the reaction to give the polyurethane foam, for example through the reaction of isocyanates with water or with acids. Examples of other blowing agents are linear $C_1$-$C_6$-alkanes, branched $C_4$-$C_6$-alkanes and cyclic $C_3$-$C_6$-alkanes. Specific examples of blowing agents are methane, ethane, propane, n-butane, isobutane, n-pentane, cyclopentane, isohexane and/or cyclohexane. Other examples are the partially fluorinated or perfluorinated derivatives of methane, ethane, propane, n-butane, isobutane, n-pentane, cyclopentane, hexane, isohexane, 2,3-dimethylbutane and/or cyclohexane.

The proportion of the blowing agent in the reaction mixture comprising components A), B) and C), but without D), can by way of example be from ≥5% by weight to ≤60% by weight. The proportion of the blowing agent in the reaction mixture comprising components A), B), C) and D) can by way of example be from ≥3% by weight to ≤60% by weight, preferably from ≥4% by weight to ≤40% by weight and particularly preferably from ≥5% by weight to ≤30% by weight.

Component D) is a polyisocyanate, i.e. an isocyanate with an NCO functionality of ≥2. The reaction mixture then present can therefore react to give polyurethane foams or else to give polyisocyanurate foams. The said reaction mixture can be produced directly in a mixing head.

Examples of these suitable polyisocyanates are butylene 1,4-diisocyanate, pentane 1,5-diisocyanate, hexamethylene 1,6-diisocyanate (HDI), isophorone diisocyanate (IPDI), 2,2,4- and/or 2,4,4-trimethylhexamethylene diisocyanate, the isomeric bis(4,4'-isocyanatocyclohexyl)methanes or mixtures of these where isomer content is as desired, cyclohexylene 1,4-diisocyanate, phenylene 1,4-diisocyanate, tolylene 2,4- and/or 2,6-diisocyanate (TDI), naphthylene 1,5-diisocyanate, diphenylmethane 2,2'- and/or 2,4'- and/or 4,4'-diisocyanate (MDI) and/or higher homologues (polymeric MDI), 1,3- and/or 1,4-bis(2-isocyanatoprop-2-yl)benzene (TMXDI), 1,3-bis(isocyanatomethyl)benzene (XDI), and also alkyl 2,6-diisocyanatohexanoates (lysine diisocyanates) having $C_1$ to $C_6$-alkyl groups. Preference is given here to an isocyanate from the diphenylmethane diisocyanate group.

It is also possible to make concomitant use of proportions of the following, alongside the abovementioned polyisocyanates: diisocyanates modified with uretdione structure, isocyanurate structure, urethane structure, carbodiimide structure, uretonimine structure, allophanate structure, biuret structure, amide structure, iminooxadiazinedione structure and/or oxadiazinetrione structure, or else unmodified polyisocyanate having more than 2 NCO groups per molecule, for example 4-isocyanatomethyloctane 1,8-diisocyanate (nonane triisocyanate) or triphenylmethane 4,4',4"-triisocyanate.

It is possible that the isocyanate is a prepolymer which is obtainable through reaction of an isocyanate with an NCO functionality of ≥2 with polyols with a molar mass of from ≥62 g/mol to ≤8000 g/mol and with OH functionalities of from ≥1.5 to ≤6.

It is also possible, of course, to use other conventional auxiliaries and additives in the production of the polyurethane foam, for example catalysts, flame retardants, release agents, fillers and the like.

The ratio between the number of the NCO groups in polyisocyanate component D) and the number of the groups in component A) that are reactive towards isocyanates can by way of example be from ≥50:100 to ≤500:100. The said index can also be in the range from ≥160:100 to ≤330:100 or else from ≥80:100 to ≤140:100.

In one embodiment of the process of the invention, the pressure prevailing after the mixing of components A), B), C), and D) is from ≥40 bar to ≤150 bar. This state can in particular prevail in a mixing head and after a mixing head. The pressure can also be from ≥80 bar to ≤120 bar. At pressures of this type it is possible to maintain supercritical or near-critical conditions for the blowing agent used.

In another embodiment of the process of the invention, means have been arranged in the mixing head in order to increase the resistance to flow during discharge of the mixture comprising components A), B), C) and D). These means can by way of example be sieves, can be slotted plates, and/or can be grids, arranged, seen in the direction of flow, after a mixing chamber of the mixing head. The increase in the resistance to flow can have a specific effect on the pressure of the reaction mixture prior to discharge from the mixing head. The pressure thus adjusted can be lower than the pressure during the mixing of the components of the reaction mixture. It is thus possible to influence the formation and expansion of blowing agent droplets or of small bubbles of blowing agent. Means of this type are described by way of example in WO 2001/98389 A1.

In another embodiment of the process of the invention, component A) comprises a polyester polyol with a hydroxy number from ≥200 mg KOH/g to ≤600 mg KOH/g and a short-chain polyol with a hydroxy number of ≥800 mg KOH/g. Suitable polyester polyols are inter alia products with the trademark Desmophen® VP.PU 1431 from Bayer MaterialScience AG. The OH number of the polyester polyol can also be from ≥290 mg KOH/g to ≤320 mg KOH/g. Short-chain polyols are in particular polyols having from ≥2 to ≤6 carbon atoms. Glycerol is preferred. Its OH number is 1827 mg KOH/g. Addition of the short-chain polyol can advantageously increase the polarity of the polyol phase.

In another embodiment of the process of the invention, surfactant component B) comprises a polyethylene oxide polyether having oligodimethylsiloxane end groups, where the number of the dimethylsiloxane units is ≤5. This type of polyether can by way of example be represented by the idealized formula R'O—[CH$_2$CH$_2$O]$_o$—X—SiR(O—SiR$_3$)((O—SiR$_2$)$_p$R), where R=CH$_3$ and R'=H, CH$_3$ or COCH$_3$. X here can be an optional connecting group, such as alkyl-α or ω-diyl, o is from ≥1 to ≤100, preferably from ≥5 to ≤30 and more preferably from ≥10 to ≤20 and p is ≤2. The group X can by way of example be —CH$_2$—CH$_2$—CH$_2$—. A preferred surfactant is 3-(polyoxyethylene)propylheptamethyltrisiloxane. This is obtainable commercially from Dow Corning with the trademark Q2-5211®.

In another embodiment of the process of the invention, the HLB value of surfactant component B) is from ≥10 to ≤18. This index can also be in the range from ≥11 to ≤16 or in the range from ≥12 to ≤14. The HLB value (hydrophilic-lipophilic-balance value) describes the hydrophilic and lipophilic content of primarily non-ionic surfactants. The HLB value for non-ionic surfactants can be calculated as follows: HLB=20·(1−M$_h$/M), where M$_h$ is the molar mass of the hydrophobic fraction of a molecule and M is the molar mass of the entire molecule.

In another embodiment of the process of the invention, surfactant component B) is present in a form covalently bonded to a compound reactive towards isocyanates or to a polyisocyanate. The linkage preferably takes place by way of a free OH group of the surfactant. In the case of a polyester polyol, covalent linkage to a polyol can by way of example take place through an esterification reaction with an acid end group of the polyol. Linkage to a polyisocyanate takes place through reaction of an NCO group with a free OH group of the surfactant. Covalent linkage of the surfactant to a component of the polyurethane matrix immobilizes the surfactant and thus allows inhibition of migration out of the resultant polyurethane foam.

In another embodiment of the process of the invention, polyisocyanate component D) comprises monomeric and/or polymeric diphenylmethane 4,4'-diisocyanate. This type of polyisocyanate is obtainable with the trademark Desmodur® 44V70L in the form of a mixture of diphenylmethane 4,4'-diisocyanate (MDI) with isomers and with higher-functionality homologues, from Bayer MaterialScience.

In another embodiment of the process of the invention, the relative proportion by weight γ of surfactant component B) in the mixture comprising components A), B) and C) is from ≥0.05 to ≤0.3, based on the entire composition. The said mixture can also comprise other, conventional auxiliaries and other, conventional additives. The expression "mixture comprising A), B) and C)" means the ready-to-use formulation prior to addition of the polyisocyanate. It is moreover preferable that the temperature of the mixture is from ≥20° C. to ≤80° C. Under these conditions, microemulsions of the blowing agent in the polyol phase are likely to be obtained with minimum surfactant use. The γ value can also be from ≥0.10 to ≤0.26 or else from ≥0.15 to ≤0.20. The temperature can be from ≥20° C. to ≤80° C.

In another embodiment of the process of the invention, the amounts present of components A), B), C), and D) are as follows:
A) from ≥25% by weight to ≤35% by weight
B) from ≥4% by weight to ≤15% by weight
C) from ≥5% by weight to ≤40% by weight
D) from ≥30% by weight to ≤60% by weight.

The % by weight data here give a total of ≤100% by weight. Preferred amounts of the components are:
A) from ≥29% by weight to ≤31% by weight
B) from ≥8% by weight to ≤12% by weight
C) from ≥8% by weight to ≤20% by weight
D) from ≥40% by weight to ≤50% by weight.

The present invention further provides a polyurethane foam which is obtainable through a process of the invention. For details of the process, reference is made to the description above. The apparent density of the foam of the invention in accordance with DIN EN 1602 can be way of example be from ≥10 kg/m$^3$ to ≤300 kg/m$^3$ and preferably from ≥20 kg/m$^3$ to ≤100 kg/m$^3$. Preferred uses for the foam of the invention are found in thermal insulation.

In one embodiment of the polyurethane foam of the invention, this takes the form of foam with an average pore diameter of from ≥10 nm to ≤10 000 nm. The pore diameter can also be from ≥20 nm to ≤1000 nm and from ≥40 nm to ≤800 nm. The pore diameter is preferably determined by means of electron microscopy and measurement of the pores. Alternative methods are determination by mercury intrusion (DIN 66133) and nitrogen sorption (DIN 66134).

In another embodiment of the polyurethane foam of the invention, this has a bimodal cell size distribution, one maximum of the cell size distribution is in the range from ≥10 nm to ≤500 nm, and another maximum of the cell size distribution is in the range from ≥1 μm to ≤500 μm. It is preferable that the maxima are in the range from 20 nm to 200 nm and, respectively, from ≥10 μm to ≤200 μm, and more preferable that they are in the range from ≥30 nm to ≤100 nm and, respectively, from ≥20 μm to ≤100 μm.

In another embodiment of the polyurethane foam of the invention, this has a pore density of from ≥$10^9$ pores/cm$^3$ to ≤$10^{18}$ pores/cm$^3$. As previously described, the pore density is by means of electron microscopy the number of pores per unit of area is used as a basis for the volume-related calculation. The pore density can also be in the range from ≥$10^{12}$ pores/cm$^3$ to ≤$10^{17}$ pores/cm$^3$ and preferably from ≥$10^{14}$ pores/cm$^3$ to ≤$10^{16}$ pores/cm$^3$.

In another embodiment of the polyurethane foam of the invention, the thermal conductivity of the foam is from ≥6 mW/m K to ≤30 mW/m K. This conductivity can be determined by means of DIN 52616 and can also be in the range from ≥8 mW/m K to ≤25 mW/m K and preferably from ≥10 mW/m K to ≤20 mW/m K. It is preferable that the said foam is a foam blown entirely with $CO_2$. In other words, the blowing agent component used to produce the said foam is exclusively $CO_2$.

The examples below, in conjunction with the figures, provide further explanation of the present invention:

FIG. 1 shows a graph of the temperature T plotted against the surfactant content γ for the system characterized in Example 1

Figure 2:
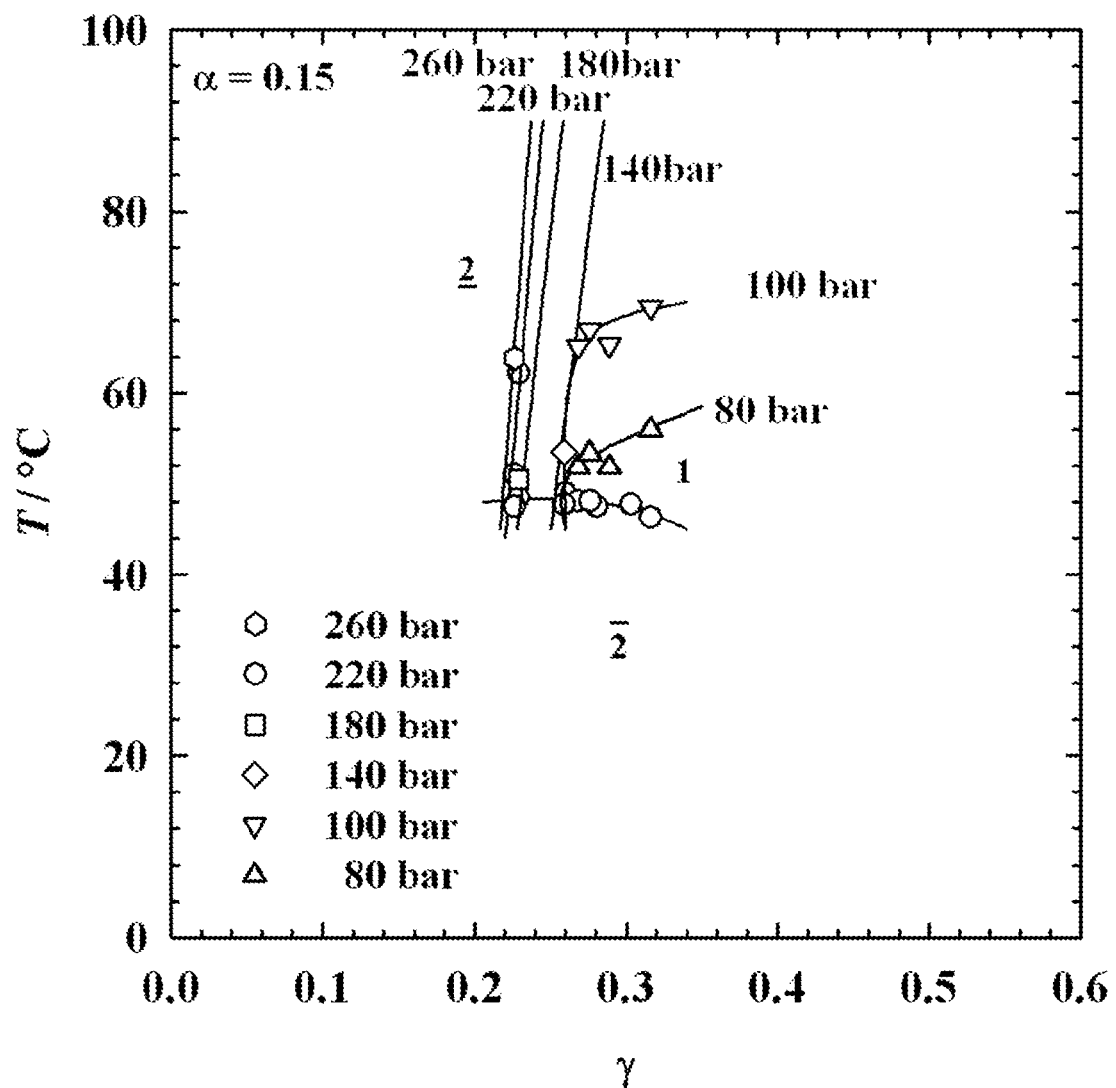
FIG. 2 illustrates a graph of the temperature T plotted against the surfactant content γ for the system characterized in Example 2.

FIG. 2 shows a graph of the temperature T plotted against the surfactant content γ for the system characterized in Example 2

Figure 3:
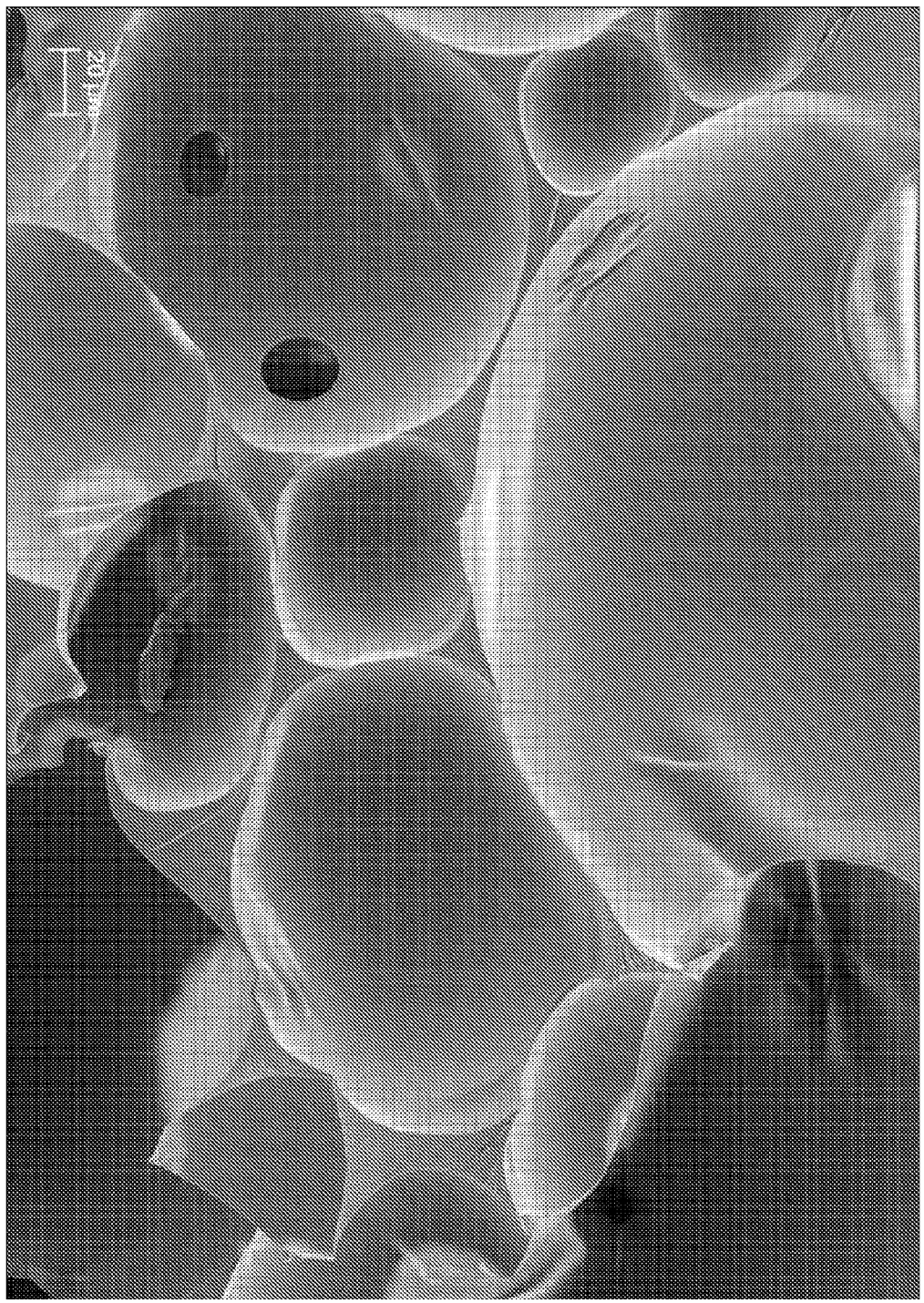
FIG. 3 illustrates a scanning electron micrograph of the foam obtained in Example 3.
Figure 4:
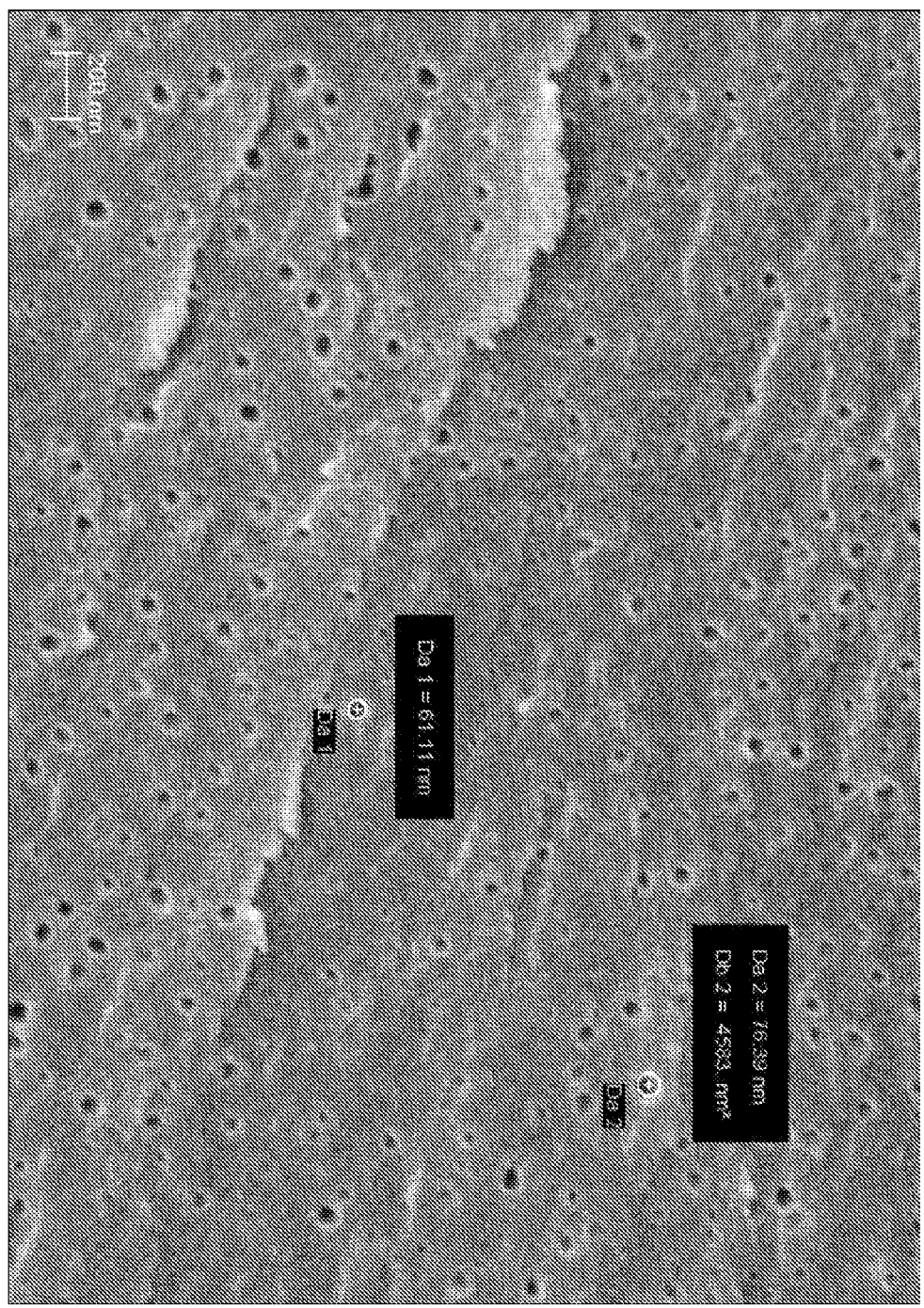
FIG. 4 illustrates a scanning electron micrograph of the foam obtained in Example 3.

FIGS. 3 and 4 show scanning electron micrographs of the foam obtained in Example 3

The value α in the examples and figures gives the relative proportion by weight of the blowing agent, i.e. of the non-polar phase, in the polyol/blowing agent mixture. The value Ψ denotes the mass fractions of the individual components in the polar phase. The value γ denotes the relative proportion by weight of the surfactant component, based on the entire composition. The reference sign 1 in the figures indicates a single-phase sector in which microemulsions occur, 2 indicates a two-phase sector where the surfactant has dissolved in the polar phase, and 2̄ indicates a two-phase sector in which the surfactant has dissolved in the non-polar phase.

The individual examples respectively relate to particular polyol/blowing agent/surfactant systems. Within the examples, various formulations have been characterized in more detail with different proportion α0 of the blowing agent. For each constant proportion α, the proportion γ of surfactant component was altered. The constitution of the surfactant component itself was kept constant in all of the examples. The temperature of the system was recorded, and connecting lines were interpolated between the measurement points, in order to determine the boundaries between the single-, two- and three-phase sectors. This method gave a diagram which is comparable with a Kahlweit-Fisch diagram (M. Kahlweit, R. Strey, Angewandte Chemie International Edition, Volume 28(8), page 654 (1985)). The point of intersection of the connecting lines is of particular interest for the characterization of the system. Once the position of the intersection point in the coordinates system of γ and T is known, a microemulsion can be expected to occur at a slightly greater proportion γ of surfactant.

The substance names used in the examples have the following meanings:

Desmophen® VP.PU 1431: difunctional polyester polyol from Bayer MaterialScience AG, OH number 310 mg KOH/g TCPP: tris(2-chloroisopropyl) phosphate Q2-5211®: siloxylated polyethylene oxide polyether from Dow Corning, 3-(polyoxyethylene)propylheptamethyl-trisiloxane, end groups: OH and heptamethyltrisiloxane, 32% of siloxane groups, 68% of ethylene oxide units; HLB value of EO content: 11.5

Desmorapid® 726b: catalyst from Bayer MaterialScience AG

Desmodur® 44V70L: mixture of diphenylmethane 4,4'-diisocyanate (MDI) with isomers and higher-functionality homologues from Bayer MaterialScience AG Desmodur® 85/25: mixture of diphenylmethane 4,4'-diisocyanate (MDI) with isomers and higher-functionality homologues from Bayer MaterialScience AG

EXAMPLE 1

In this example, Q2-52110® was used for the surfactant component. Supercritical $CO_2$ (sc$CO_2$) was used as blowing agent. The polyol component was a mixture of 80 parts by weight of Desmophen® VP.PU 1431, 15 parts by weight of glycerol and 15 parts by weight of TCPP. This corresponds to mass fractions of $\Psi_{VP.PU\ 1431}=0.728$, $\Psi_{glycerol}=0.136$ and $\Psi_{TCPP}=0.136$. Formulations were mixed with α=0.15 and α=0.30. The pressure in this example was 220 bar. FIG. 1 gives the results. The parameters determined at the point of intersection of the connecting lines in the phase diagram were as follows:

| α value | γ value | Temperature at point of intersection |
|---|---|---|
| 0.15 | 0.22 | 48° C. |
| 0.30 | 0.29 | 58° C. |

EXAMPLE 2

The system used here was the same as in Example 1, i.e. Q2-5211®, supercritical $CO_2$ and, as polyol component, a mixture of 80 parts by weight of Desmophen® VP.PU 1431, 15 parts by weight of glycerol and 15 parts by weight of TCPP. This again corresponds to mass fractions of $\Psi_{VP.PU\ 1431}=0.728$, $\Psi_{glycerol}=0.136$ and $\Psi_{TCPP}=0.136$. The pressure was varied, with an α value of 0.15. FIG. 2 gives the results. From this example it is possible to conclude that the position of the microemulsion region can be adjusted appropriately through alteration of the pressure. The parameters determined at the point of intersection of the connecting lines in the phase diagram were as follows:

| Pressure | γ value | Temperature at point of intersection |
|---|---|---|
| 260 bar | 0.22 | 48° C. |
| 220 bar | 0.23 | 48° C. |
| 180 bar | 0.23 | 48° C. |
| 140 bar | 0.25 | 48° C. |
| 100 bar | 0.25 | 48° C. |
| 80 bar | 0.26 | 48° C. |

EXAMPLE 3

A microemulsion was reacted to give a polyurethane foam. $CO_2$ was admixed here with the mixture of polyols, TCPP and surfactant at 58° C. and at a pressure of 170 bar. Without restriction to any theory, it is assumed that a microemulsion of scCO₂ droplets in the polyol phase formed here. The polyisocyanate was admixed with the said emulsion in a high-pressure mixing head. The reaction mixture was then introduced into an open beaker. A free foam was obtained.

The formulation was as follows:

| Component | OH number | Parts by weight | % by weight |
|---|---|---|---|
| Desmophen ® VP.PU 1431 | 310 mg KOH/g | 80 | 29.93% |
| Glycerol | 1827 mg KOH/g | 15 | 4.86% |
| TCPP | 0 | 15 | 4.86% |
| Q2-5211 ® | not determined | 45 | 14.59% |
| Desmorapid ® 726b | 0 | 0.30 | 0.10% |
| CO₂ | 0 | 19.4 | 6.29% |
| Desmodur ® 44V70L (NCO content 30.9% by weight) | | 133.7 | 43.37% |

Reaction parameters:
Isocyanate temperature: 58° C.
Polyol temperature: 59° C.
Mixing time: 2 seconds The α and γ values have been calculated inclusive of the isocyanate. The total weight was 120 grams. The resultant foam was studied by means of scanning electron microscopy. FIGS. 3 and 4 show scanning electron micrographs at different scales. Pores of diameter markedly less than 100 nm are seen to have formed in the interstices (this being a team which in spherical geometry refers to a point set which delimited by two great circles) of the resultant foam. The average pore radius is 15±6.8 nm. The average numeric density of the pores was $4.7 \cdot 10^{14}$.

The invention claimed is:

1. A process for producing a polyurethane foam, comprising the following steps:
   providing a mixture in a mixing head, where the mixture comprises:
   A) a component reactive towards isocyanates;
   B) a surfactant component;
   C) a blowing agent component selected from the group consisting of linear, branched or cyclic $C_1$- to $C_6$-alkanes, linear, branched or cyclic $C_1$- to $C_6$-fluoroalkanes, $N_2$, $O_2$, argon and/or $CO_2$;
   wherein the blowing agent component C) is present in the supercritical or near-critical state; and
   D) a polyisocyanate component;
   wherein:
   the prevailing pressure after the mixing of components A),B),C), and D) is from ≥80 bar to ≤150 bar,
   the proportion of the blowing agent C) in the reaction mixture comprising components A),B),C), and D), is in the range from ≥3% by weight to ≤60% by weight,
   the temperature of the mixture is in the rang of from ≥20 °C and ≤80 °C, and the relative proportion by weight Y of surfactant component B) in the mixture comprising components A),B) and C) is from ≤0.05 to ≥0.3, based on the entire composition;
   discharging the mixture comprising components A), B), C), and D) from the mixing head wherein, during the discharge of the mixture, the pressure prevailing in the mixture is lowered to atmospheric pressure;
   whereby the produced polyurethane foam has (i) an average pore diameter of from ≥10 nm to ≤10000 nm and (ii) a bimodal cell size distribution, wherein one maximum of the cell size distribution is in the range from ≥10 nm to ≤500 nm and a further maximum of the cell size distribution is in the range from ≥1 μm to ≤500 μm.

2. The process according to claim 1, wherein means have been arranged in the mixing head in order to increase the resistance to flow during the discharge of the mixture comprising components A), B), C) and D).

3. The process according to claim 1, wherein component A) comprises a polyester polyol having a hydroxy number from ≥200 mg KOH/g to ≤600 mg KOH/g and a short-chain polyol having a hydroxy number of ≥800 mg KOH/g.

4. The process according to claim 1, wherein the surfactant component B) comprises a polyethylene oxide-polyether having oligodimethylsiloxane end groups, wherein the number of the dimethylsiloxane units is ≤5.

5. The process according to claim 1, wherein the HLB value of the surfactant component is from ≥10 to ≤18.

6. The process according to claim 1, wherein the surfactant component B) is present in a form covalently bonded to a compound reactive towards isocyanates or to a polyisocyanate.

7. The process according to claim 1, wherein the polyisocyanate component D) comprises monomeric and/or polymeric diphenylmethane 4,4'-diisocyanate.

8. The process according to claim 1, wherein the amounts present of components A), B), C), and D) are as follows:
   A) from ≥25% by weight to ≤35% by weight; and
   B) from ≥4% by weight to ≤15% by weight; and
   C) from ≥5% by weight to ≤40% by weight; and
   D) from ≥30% by weight to ≤60% by weight.

* * * * *